(12) United States Patent
Gilmour et al.

(10) Patent No.: US 12,228,163 B2
(45) Date of Patent: Feb. 18, 2025

(54) NUT WITH INJECTION PORT FOR REINFORCING BAR

(71) Applicant: Illinois Tool Works Inc., Glenview, IL (US)

(72) Inventors: Cameron Gilmour, Auckland (NZ); Emanuele Naccini, Auckland (NZ); Terry Seagrave, Auckland (NZ)

(73) Assignee: Illinois Tool Works Inc., Glenview, IL (US)

( * ) Notice: Subject to any disclaimer, the term of this patent is extended or adjusted under 35 U.S.C. 154(b) by 146 days.

(21) Appl. No.: 17/892,778

(22) Filed: Aug. 22, 2022

(65) Prior Publication Data
US 2023/0065174 A1   Mar. 2, 2023

(30) Foreign Application Priority Data

| Aug. 25, 2021 | (AU) | ................................. | 2021221724 |
| Jul. 29, 2022 | (AU) | ................................. | 2022209356 |

(51) Int. Cl.
*F16B 39/02* (2006.01)
*F16B 37/04* (2006.01)

(52) U.S. Cl.
CPC .......... *F16B 39/021* (2013.01); *F16B 37/048* (2013.01); *F16B 39/02* (2013.01)

(58) Field of Classification Search
CPC .......... F16B 25/00; F16B 37/00; F16B 37/04; F16B 37/044–045; F16B 37/048; F16B 37/06; F16B 37/14; F16B 39/02; F16B 39/021

USPC ......... 411/82, 82.1, 383, 427, 429, 432, 930
See application file for complete search history.

(56) References Cited

U.S. PATENT DOCUMENTS

| 103,348   | A | * | 5/1870 | Ligon ..................... | F16B 39/34 |
|           |   |   |        |                            | 411/257    |
| 299,447   | A | * | 5/1884 | Williams ................ | F16B 39/32 |
|           |   |   |        |                            | 411/930    |
| 990,732   | A | * | 4/1911 | Harper .................... | F16B 39/34 |
|           |   |   |        |                            | 411/257    |
| 3,750,537 | A | * | 8/1973 | Goade ..................... | F16B 39/34 |
|           |   |   |        |                            | 411/930    |
| 4,266,460 | A | * | 5/1981 | Klimowicz ............. | F16B 39/04 |
|           |   |   |        |                            | 411/397    |

(Continued)

FOREIGN PATENT DOCUMENTS

| AU | 311290 S | 11/2006 |
| AU | 346989 S | 2/2013 |

(Continued)

OTHER PUBLICATIONS

Images of Nuts available prior to Aug. 25, 2021 (4 pages).

(Continued)

*Primary Examiner* — Roberta S Delisle
(74) *Attorney, Agent, or Firm* — Neal, Gerber & Eisenberg LLP

(57) ABSTRACT

A nut for threading onto a reinforcing bar, wherein the nut includes a female thread for threading onto a male thread of the reinforcing bar, wherein the nut includes a port arranged such that, when the nut is in situ on the reinforcing bar the port provides a passage for injection of fluid material to flow into a cavity defined by an external surface of the reinforcing bar and an internal surface of the nut.

16 Claims, 8 Drawing Sheets

(56) References Cited

U.S. PATENT DOCUMENTS

| | | | | |
|---|---|---|---|---|
| 4,815,994 A * | 3/1989 | Hickham, Jr. | ........... | F16N 21/00 |
| | | | | 440/62 |
| 8,439,220 B2 * | 5/2013 | Norman | ................ | F01D 25/265 |
| | | | | 220/228 |
| 8,616,819 B1 * | 12/2013 | Koster | .................... | F16B 39/04 |
| | | | | 411/432 |
| 2014/0115870 A1 * | 5/2014 | Miller | .................... | F16B 35/00 |
| | | | | 29/525.11 |
| 2022/0082191 A1 * | 3/2022 | Alshiha | ................ | F16L 23/165 |

FOREIGN PATENT DOCUMENTS

| | | |
|---|---|---|
| AU | 347957 S | 4/2013 |
| EP | 2463531 A1 | 6/2012 |
| JP | 2010236277 A | 10/2010 |
| WO | 2010098401 A1 | 9/2010 |
| WO | 2012117259 A2 | 9/2012 |
| WO | 2013178985 A1 | 12/2013 |
| WO | 2016126462 A1 | 8/2016 |
| WO | 2018000536 A1 | 1/2018 |
| WO | 2018190536 A1 | 10/2018 |
| WO | 2022056186 A1 | 3/2022 |

OTHER PUBLICATIONS

BT Couplers from Ancon® a CRH Company, https://www.ancon.com.au/products/reinforcing-bar-couplers/bt-couplers, available prior to Aug. 25, 2021 (5 pages).

Grip Tec® Brochure, from Dextra, available prior to Aug. 25, 2021 (4 pages).

* cited by examiner

NUT WITH INJECTION PORT FOR REINFORCING BAR

PRIORITY CLAIM

The present application claims priority to and the benefit of Australian Patent Application No. 2021221724, filed Aug. 25, 2021, and Australian Patent Application No. 2022209356, filed Jul. 29, 2022, the entire contents of each of which are incorporated herein by reference.

FIELD

The present disclosure relates generally, but not exclusively, to a flange nut for providing a headed anchorage to a reinforcing bar for reinforcing concrete.

BACKGROUND

It is known to provide reinforcing bars for reinforcing concrete. It is also known to provide flange nuts for the purpose of being used as headed anchorages on the ends of reinforcing bars. Typically, these flange nuts are used at the ends of the reinforcement bars as termination points or bar ends and are secured with a half nut and recommended epoxy.

The present disclosure contemplates that it would be desirable to use the flange nut product in expanded applications to include flange nuts being installed in mid-bar applications or installed at a certain distance from the bar end. This may make the application of epoxy difficult for customers. More specifically, the current procedure and product design relies on the user applying epoxy to an internal thread of the flange nut prior to winding down the reinforcing bar. This would cause a number of negative points including one or more of the following: (1) epoxy coating the reinforcing bar as the flange nut is wound down causing a messy installation which requires extra labour to be cleaned (see FIG. 1); and (2) loss of epoxy in the connection between the reinforcing bar and flange nut will compromise the joint between the two components. In certain instances, it is critical that epoxy completely fills a void between the external thread of the reinforcing bar and an internal thread of the flange nut to guarantee a required stiffness of the joint.

Examples of the present disclosure seek to provide an improved nut which obviates or at least alleviates one or more disadvantages of existing anchorage nuts.

SUMMARY

In accordance with one aspect of the present disclosure, there is provided a nut for threading onto a reinforcing bar, wherein the nut includes a female thread for threading onto a male thread of the reinforcing bar, wherein the nut includes a port arranged such that, when the nut is in situ on the reinforcing bar the port provides a passage for injection of fluid material to flow into a cavity defined by an external surface of the reinforcing bar and an internal surface of the nut.

Preferably, the port extends generally radially with respect to a longitudinal axis about which the nut rotates.

In a preferred form, the port is transverse of the nut, extending between an outer surface of the nut and an inner surface of the nut.

Preferably, the nut has only a single passage for injection of fluid material to flow into a cavity defined by an external surface of the reinforcing bar and an internal surface of the nut, said single passage being in the form of said port.

Alternatively, the nut has at least two passages for injection of fluid material to flow into a cavity defined by an external surface of the reinforcing bar and an internal surface of the nut, including a first passage defined by said port, said port being a first port, and a second passage defined by a second port.

It is preferred that the second port is opposite the first port. More preferably, the second port is diametrically opposite the first port.

Preferably, the nut includes a cap for covering at least one of the ports.

In a preferred form, the nut includes a first cap for covering the first port and a second cap for covering the second port.

Preferably, the nut includes a flange.

In a preferred form, the port is located in a central portion of the nut with respect to a longitudinal direction of the nut.

In accordance with another aspect of the present disclosure, there is provided an assembly including a reinforcing bar and a nut, wherein the nut is threaded onto the reinforcing bar such that an internal thread of the nut engages with a corresponding external thread of the reinforcing bar, wherein the nut includes a port arranged such that the port provides a passage for injection of fluid material to flow into a cavity defined by an external surface of the reinforcing bar and an internal surface of the nut.

In accordance with another aspect of the present disclosure, there is provided a method of securing a nut on a reinforcing bar, including the steps of threading the nut onto the reinforcing bar such that an internal thread of the nut is threaded onto an external thread of the reinforcing bar, rotating the nut to locate the nut in a desired position along a length of the reinforcing bar, and injecting settable material through a port of the nut such that the settable material flows into a cavity between an external surface of the reinforcing bar and an internal surface of the nut.

Preferably, the method further includes the step of observing a second port opposite the first port to determine when sufficient settable material has been injected through the first port, and ceasing injection of the settable material in response to observing sufficient settable material through the second port.

In accordance with another aspect of the present disclosure, there is provided a nut for threading onto a reinforcing bar, wherein the nut includes a female thread for threading onto a male thread of the reinforcing bar, wherein the nut includes a port arranged such that, when the nut is in situ on the reinforcing bar the port provides a passage for injection of fluid material to flow into a cavity defined by an external surface of the reinforcing bar and an internal surface of the nut, wherein the nut has only a single passage for injection of fluid material to flow into a cavity defined by an external surface of the reinforcing bar and an internal surface of the nut, said single passage being in the form of said port.

In accordance with another aspect of the present disclosure, there is provided a nut for threading onto a reinforcing bar, wherein the nut includes a female thread for threading onto a male thread of the reinforcing bar, wherein the nut includes a port arranged such that, when the nut is in situ on the reinforcing bar the port provides a passage for injection of fluid material to flow into a cavity defined by an external surface of the reinforcing bar and an internal surface of the nut, wherein the nut has at least two passages for injection of fluid material to flow into a cavity defined by an external surface of the reinforcing bar and an internal surface of the nut, including a first passage defined by said port, said port being a first port, and a second passage defined by a second port.

In accordance with another aspect of the present disclosure, there is provided a nut for threading onto a reinforcing bar, wherein the nut includes a female thread for threading onto a male thread of the reinforcing bar, wherein the nut includes a port arranged such that, when the nut is in situ on the reinforcing bar the port provides a passage for injection of fluid material to flow into a cavity defined by an external surface of the reinforcing bar and an internal surface of the nut, wherein the nut has at least two passages for injection of fluid material to flow into a cavity defined by an external surface of the reinforcing bar and an internal surface of the nut, including a first passage defined by said port, said port being a first port, and a second passage defined by a second port, and wherein the nut includes a cap for covering at least one of said first and second ports.

BRIEF DESCRIPTION OF THE DRAWINGS

Preferred embodiments of the present disclosure will be described, by way of a non-limiting example only, with reference to the accompanying drawings in which.

DETAILED DESCRIPTION

Figure 1:
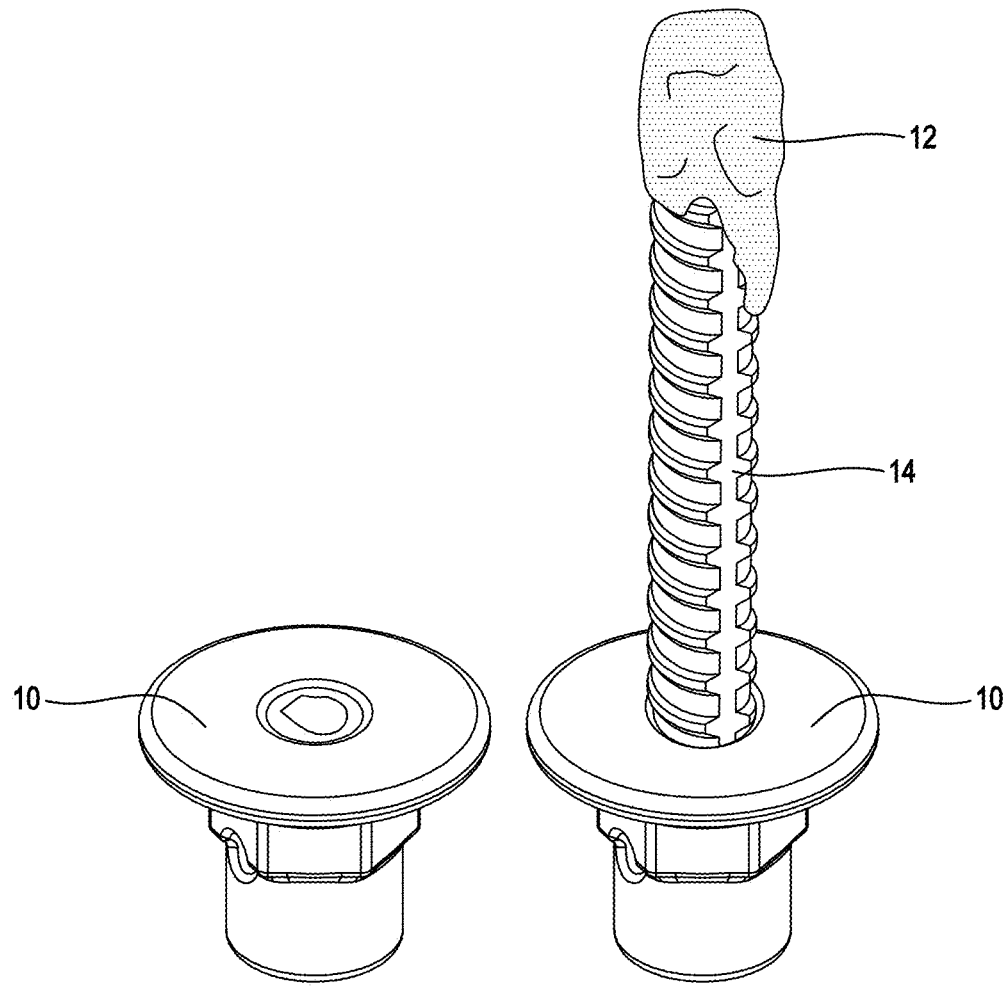
FIG. 1 shows an epoxy coating of a reinforcing bar after a flange nut has been wound into position.
Figure 2:
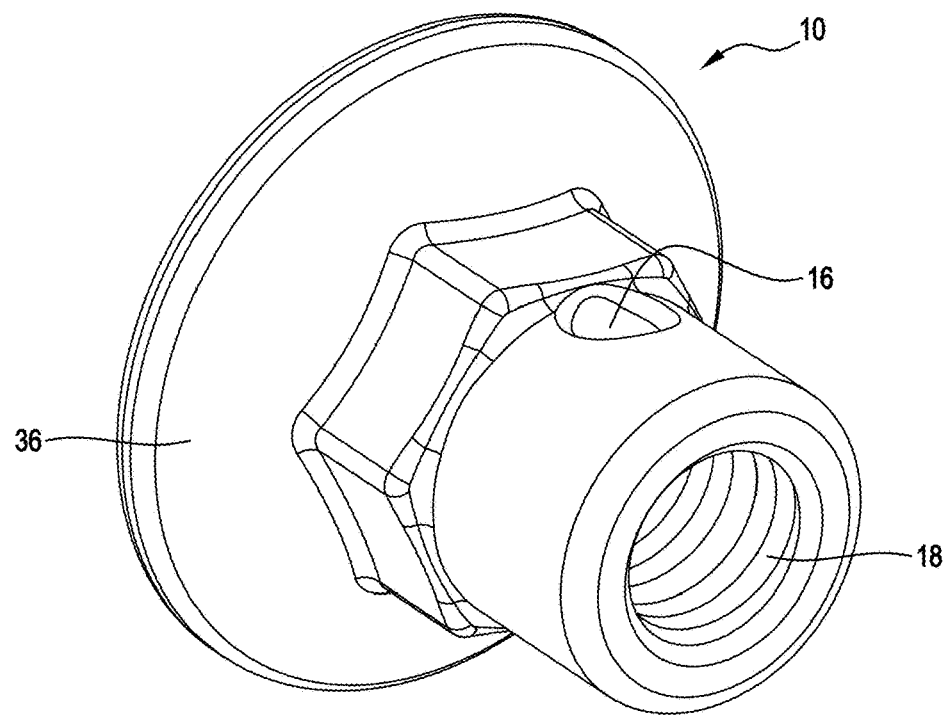
FIG. 2 shows a steel flange nut in accordance with an example embodiment of the present disclosure, showing an injection port in position.

While the systems, devices, and methods described herein may be embodied in various forms, the drawings show, and the specification describes certain exemplary and non-limiting embodiments. Not all of the components shown in the drawings and described in the specification may be required, and certain implementations may include additional, different, or fewer components. Variations in the arrangement and type of the components; the shapes, sizes, and materials of the components; and the manners of connections of the components may be made without departing from the spirit or scope of the claims. Unless otherwise indicated, any directions referred to in the specification reflect the orientations of the components shown in the corresponding drawings and do not limit the scope of the present disclosure. Further, terms that refer to mounting methods, such as mounted, connected, etc., are not intended to be limited to direct mounting methods but should be interpreted broadly to include indirect and operably mounted, connected, and like mounting methods. This specification is intended to be taken as a whole and interpreted in accordance with the principles of the present disclosure and as understood by one of ordinary skill in the art.

With reference to FIG. 1 of the drawings, existing flange nuts 10 will provide difficulty to users as epoxy 12 is applied to an internal thread of the flange nut 10 prior to fitting of the flange nut 10 on the reinforcing bar 14. Accordingly, the epoxy 12 will be smeared along the length of the reinforcing bar 14 (see FIG. 1), creating messiness, waste, and possibly an inferior connection.

As shown in FIGS. 2 to 11, an improved flange nut 10 of on example embodiment of the present disclosure is provided and includes and defines an injection port 16. In particular, the inclusion of an injection port 16 is applicable to steel flange nut 10 products in various embodiments of the present disclosure. Advantageously, the inclusion of the injection port 16 aids the application of epoxy 12 as well as providing a solution for installing the flange nut 10 at a position that is not on the end of the reinforcing bar 14 but rather spaced from the end of the reinforcing bar (as well as spaced from the opposite end of the reinforcing bar 14).

Accordingly, FIGS. 2 to 11 show a nut 10 for threading onto a reinforcing bar 14, wherein the nut includes a female thread 18 for threading onto a male thread 20 of the reinforcing bar 14. The nut 10 includes a port 16 arranged such that, when the nut 10 is in situ on the reinforcing bar 14 (see FIG. 8) the port 16 provides a passage for injection of fluid material to flow into a cavity 22. The cavity 22 is defined between an external surface 24 of the reinforcing bar 14 and an internal surface 26 of the nut 10. The fluid material may be in the form of epoxy 12.

Figure 3:
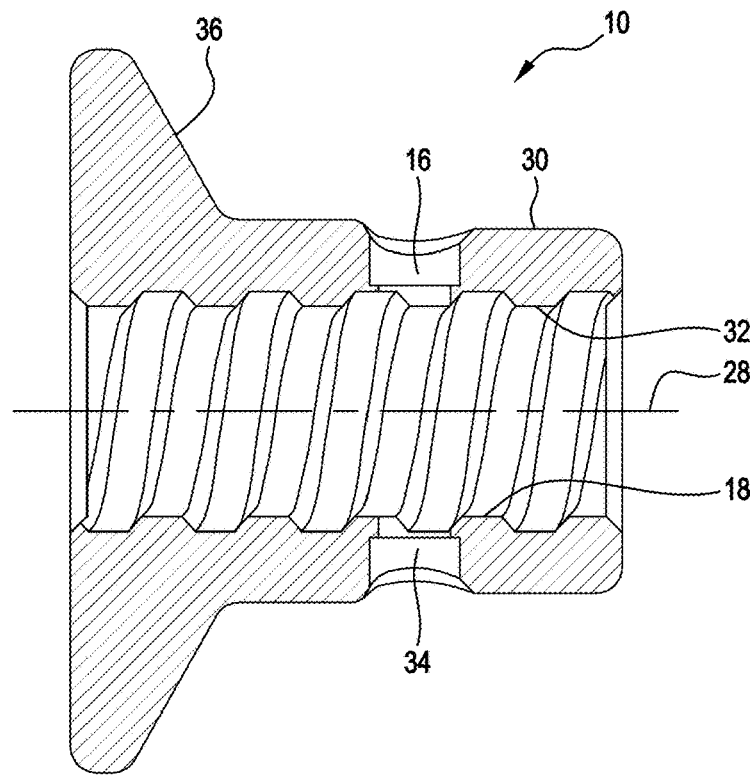
FIG. 3 shows a cross-sectional view of a steel flange nut, showing injection port detail.

As shown in FIG. 3, the port 16 extends generally radially with respect to a longitudinal axis 28 about which the nut 10 rotates. In the example shown, the port 16 is transverse of the nut 10, extending between an outer surface 30 of the nut 10 and an inner surface 32 of the nut 10.

The port 16 may be in the form of a first port and the nut 10 may also be provided with a second port 34 opposite the first port 16. The second port 34 may be diametrically opposite the first port 16, as shown in FIG. 3.

In one example, the nut 10 may include a cap (not shown) for covering the or each port 16. Additionally, the nut 10 may include a flange 36 to assist with the purpose of being used as an anchorage on the reinforcing bar 14 within concrete when the concrete has set.

The port 16 may be located in a generally central portion of the nut 10 with respect to a longitudinal direction 28 of the nut 10.

Another aspect of the present disclosure provides an assembly 38 including the flange nut 10 and the reinforcing bar 14, when assembled. Accordingly, with reference to FIG. 8, there is provided an assembly 38 including the reinforcing bar 14 and the nut 10. The nut 10 is threaded onto the reinforcing bar 14 such that the internal thread 18 of the nut 10 engages with the corresponding external thread 20 of the reinforcing bar 14. The nut 10 includes the port 16 arranged such that the port 16 provides a passage for injection of fluid material 12 to flow into the cavity 22 defined by the external surface 24 of the reinforcing bar 14 and the internal surface 26 of the nut 10.

The present disclosure also provides another aspect of a method of securing the nut 10 on the reinforcing bar 14. The method includes the steps of threading the nut 10 onto the reinforcing bar 14 such that the internal thread 18 of the nut 10 is threaded onto the external thread 20 of the reinforcing bar 14, rotating the nut 10 to locate the nut 10 in a desired position along a length of the reinforcing bar 14, and injecting settable material through a port 16 of the nut 10 such that the settable material flows into the cavity 22 between an external surface 24 of the reinforcing bar 14 and an internal surface 26 of the nut 10.

The method may further include the step of observing the second port 34 opposite the first port 16 to determine when sufficient settable material has been injected through the first port 16, and ceasing injection of the settable material in response to observing sufficient settable material through the second port 34. In this way, the flange nut 10 has two passages for injection of fluid material to flow into a cavity defined by an external surface of the reinforcing bar 14 and an internal surface of the nut 10, including a first passage defined by the first port 16 and a second passage defined by the second port 34.

Figure 4:
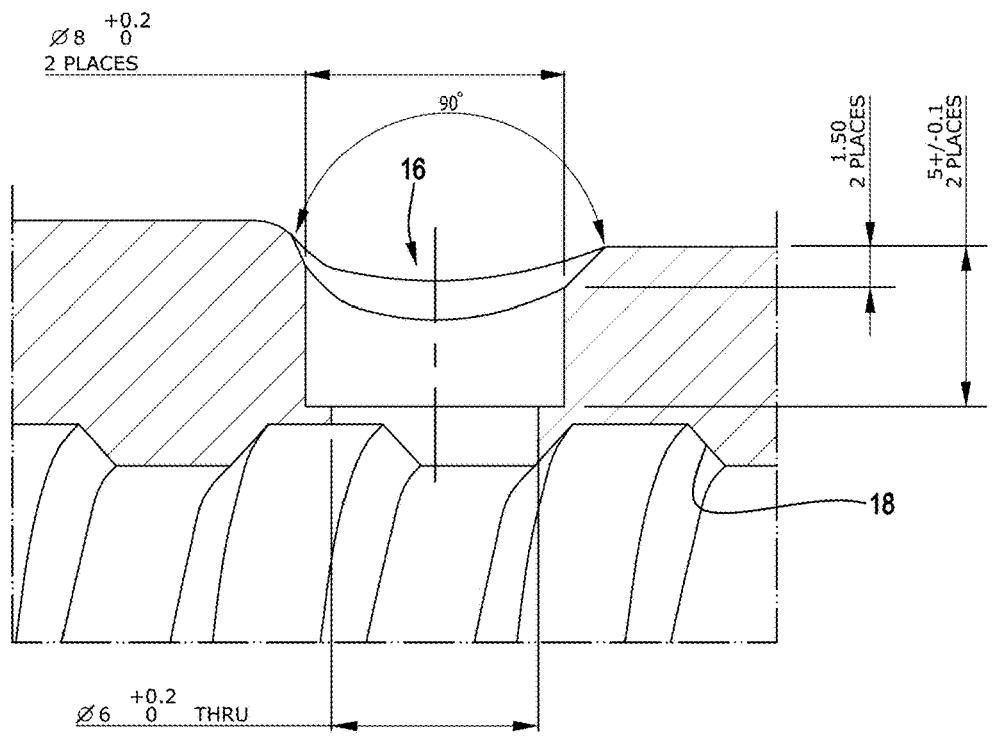
FIG. 4 shows a dimensioned cross section of injection port detail.
Figure 5:
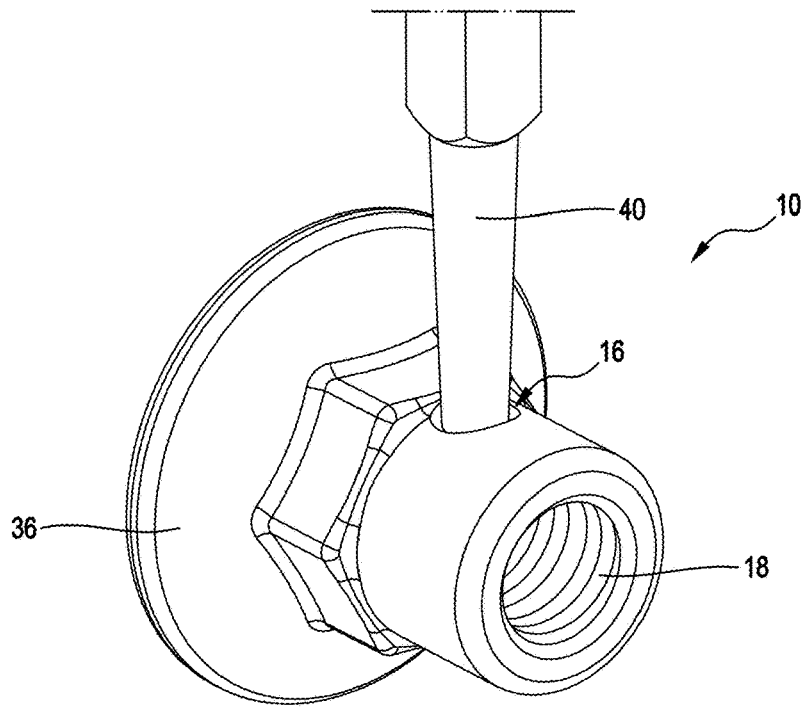
FIG. 5 shows an ISNE (Injection System Nozzle Epoxy) nozzle inserted into the injection port.
Figure 6:
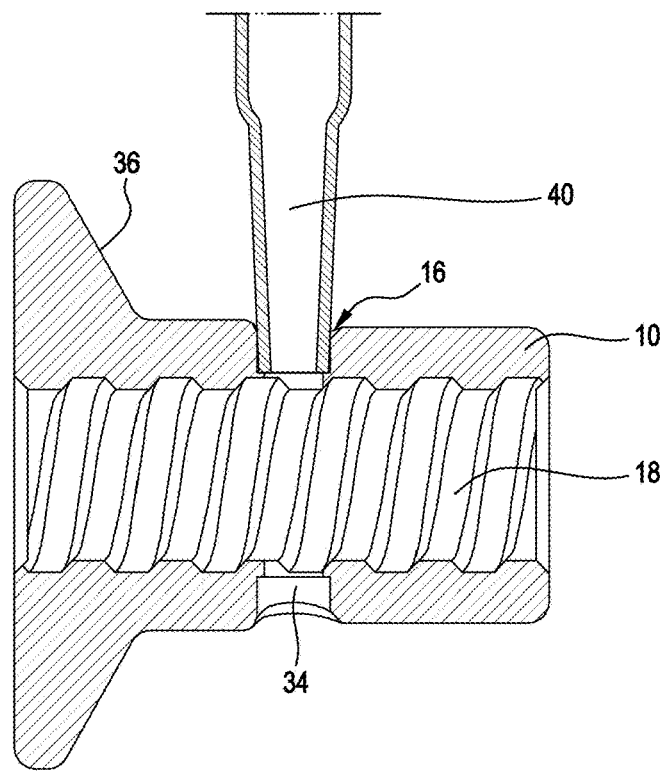
FIG. 6 shows a cross section of an ISNE nozzle inserted into injection port.
Figure 7:
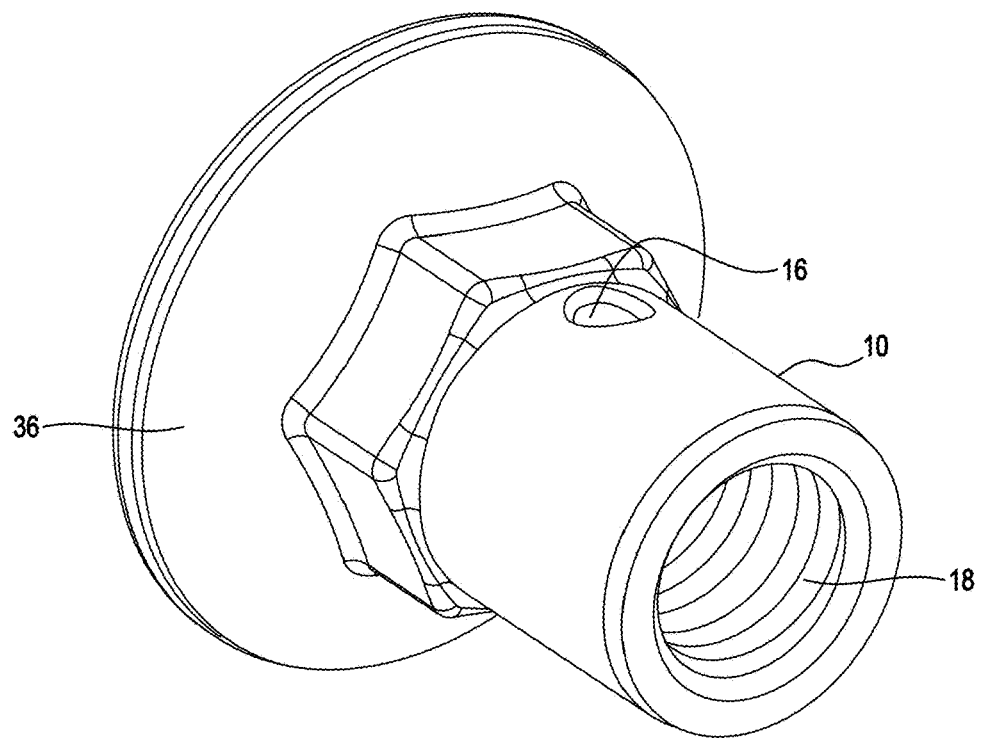
FIG. 7 shows a perspective view of the injection port position in relation to surrounding external detail of the nut.
Figure 8:
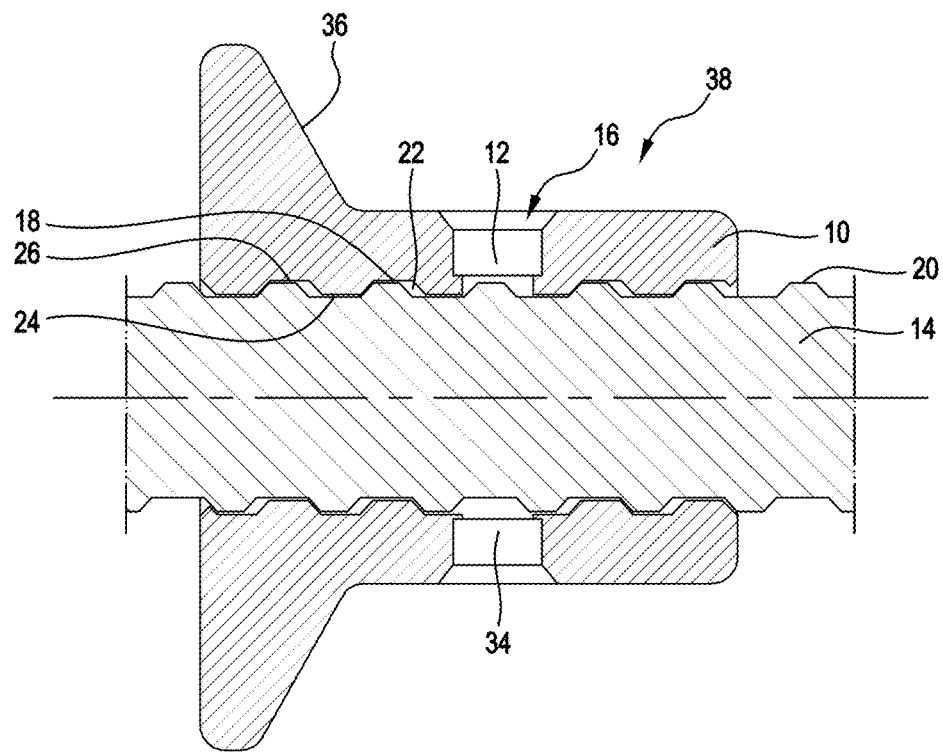
FIG. 8 shows a cross sectional view of the nut on a reinforcing bar with epoxy volume depicted.
Figure 9:
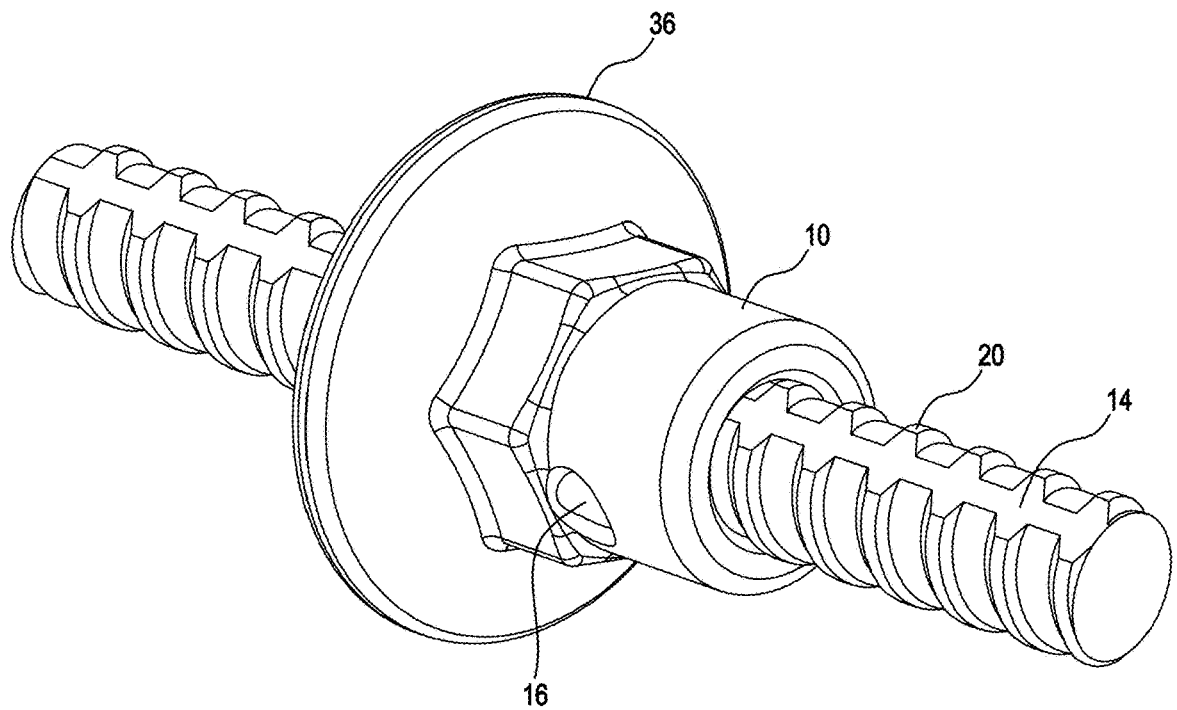
FIG. 9 shows a perspective view of the flange nut located on the reinforcing bar.

The following unique details and innovative features of the product component have been identified:

1. Inclusion of an injection port 16 in the design of the flange nut 10 (see FIG. 2).
2. Dimensions of the injection port 16 may be standard across all flange nut sizes and may be configured to fit the ISNE (Injection System Nozzle Epoxy) nozzle 40 used with the product branded as Ramset Epcon C8 XTREM. FIG. 4 shows a detailed cross-section of the injection port 16 detail, including example dimensions. An opening to the injection port 16 may be tapered outwardly to facilitate location and insertion of the nozzle used for injecting settable material.
3. Injection port 16 forms a hole through the flange nut 10 (as shown in FIG. 3 and FIG. 6). The second port 34 in the form of a secondary hole serves both as an alternative injection point depending on its accessibility and position and as a way to inspect and ensure epoxy 12 has fully filled the thread cavity 22.
4. Position of the injection port 16 such that it does not affect any of the existing flange nut 10 features and detail.
5. Injection port 16 detail may be included in a range of reinforcing bar flange nuts. For example, the injection port 16 detail may be included in a range of reinforcing bar products branded as "ReidBar" Steel Flange Nuts across all sizes including, RB12, RBA16, RBA20, RB20, RB25, RB32.

Figure 10:
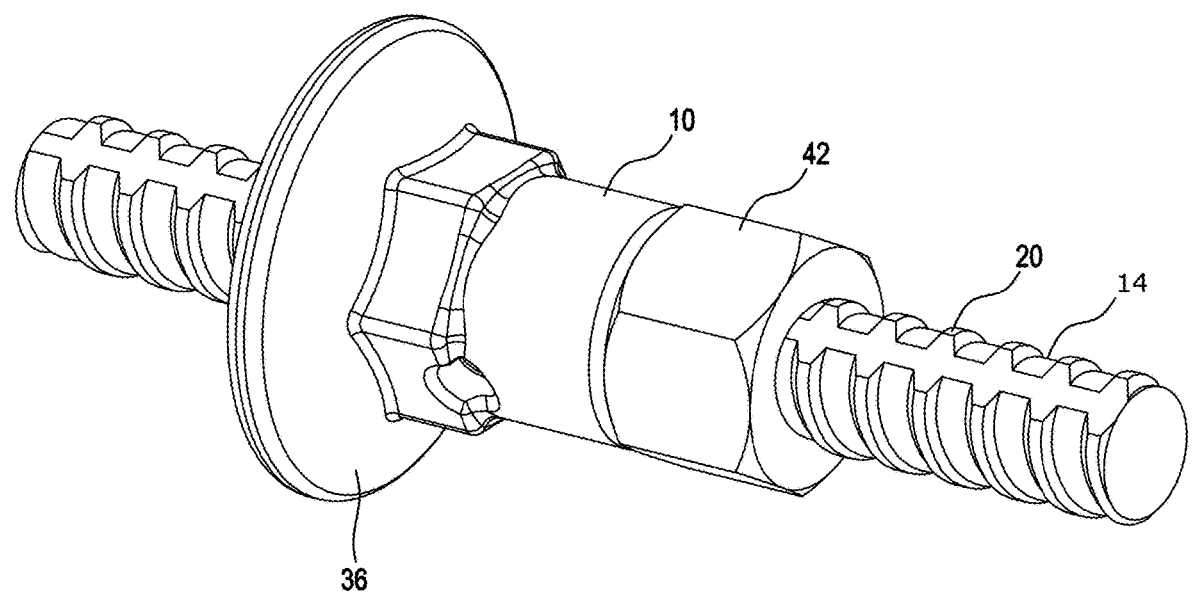
FIG. 10 shows a perspective view of the flange nut located on the reinforcing bar, with a half nut in front of the flange nut.
Figure 11:
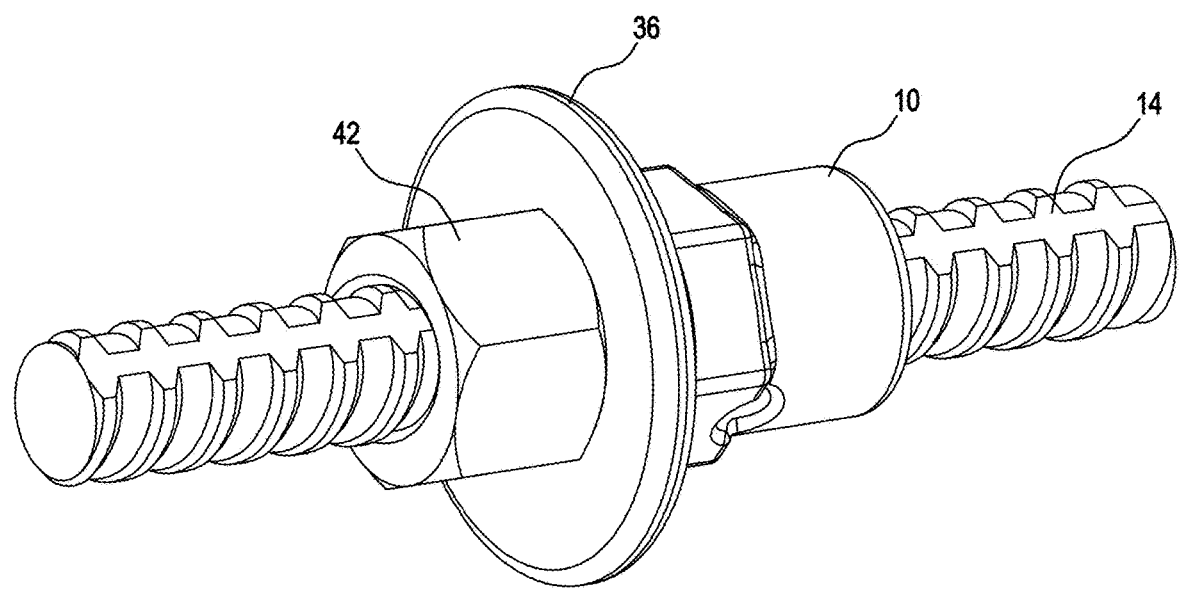
FIG. 11 shows a perspective view of the flange nut located on the reinforcing bar, with a half nut behind the flange nut.

The system may be assembled either without a half nut 42 (see FIG. 9) or with a half nut 42 (see FIGS. 10 and 11). For assembly without a half nut 42, the following steps are taken in accordance with one embodiment of the present disclosure:

1. Position flange nut 10 at desired position on reinforcing bar 14.
2. Insert ISNE nozzle 40 fitted to Epcon C8 XTREM cartridge into injection port 16 (or second port 34), whichever is easiest to access.
3. While the nozzle 40 is positioned in the injection port 16, insert epoxy 12 until excess flows from either end of the flange nut 10 and the opposing injection port 34.
4. Do not disturb the assembly after 'gel time' (between 5 and 20 minutes, depending on the temperature) and allow the correct time for the epoxy to cure (between 8 and 60 hours depending on temperature and environmental conditions).

For assembly with a half nut 42, the following steps are taken in accordance with one embodiment of the present disclosure:

1. Position half nut 42 at desired position on reinforcing bar 14.
2. Wind flange nut 10 onto half nut 42 at desired position on reinforcing bar 14 reinforcement.
3. Tighten half nut 42 onto the flange nut 42 to secure assembly on reinforcing bar 14 reinforcement.
4. Insert ISNE nozzle 40 fitted to Epcon C8 XTREM cartridge into injection port 16 (or second port 34) whichever is easiest to access.
5. While the nozzle 40 is positioned in the injection port 16, insert epoxy 12 until excess flows from free end of the flange nut 10 and the opposing injection port 34.
6. Do not disturb the assembly after 'gel time' (between 5 and 20 minutes, depending on the temperature) and allow the correct time for the epoxy 12 to cure (between 8 and 60 hours depending on temperature and environmental conditions).

Advantageously, as will be appreciated from the above, the present disclosure provides an update to its existing steel flange nut configuration with the inclusion of an injection port 16 detailed above. This allows injection of epoxy 12 after positioning the flange nut 10 on the reinforcing bar 14. This feature update is particularly applicable to a steel flange nut as opposed to a ductile cast iron product.

Figure 12:
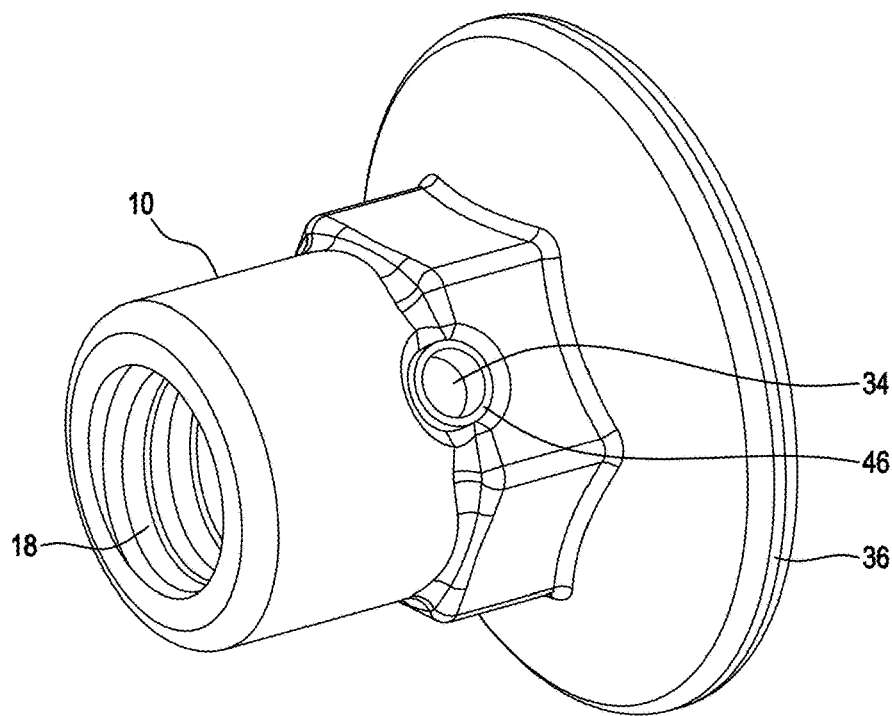
FIG. 12 shows a perspective view of a flange nut having a pair of opposed ports and caps for covering the ports.
Figure 13:
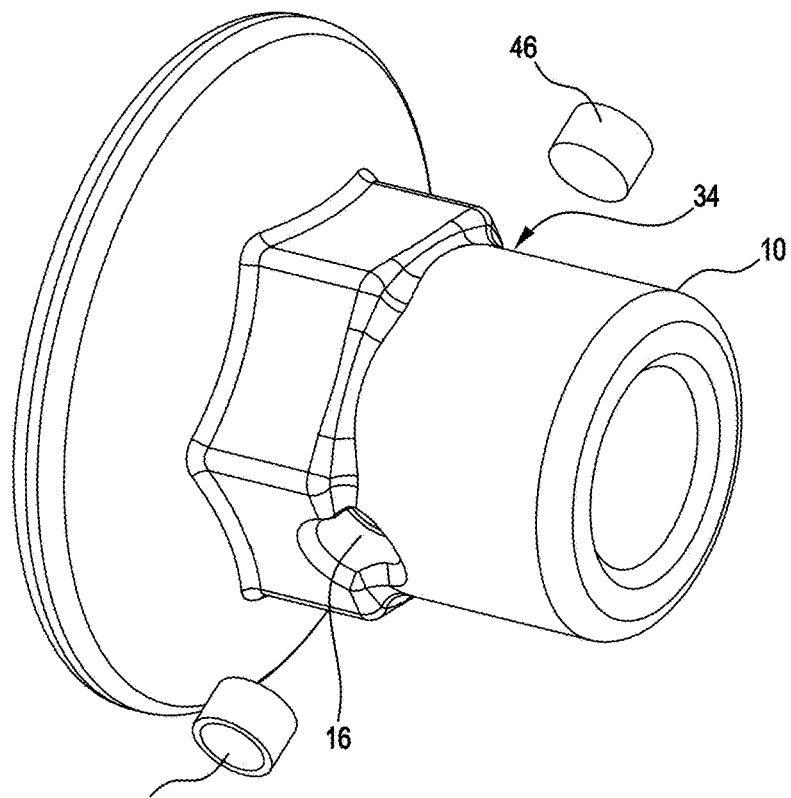
FIG. 13 shows a perspective view of the flange nut of FIG. 12, showing the caps in an exploded view relative to the ports.
Figure 14:
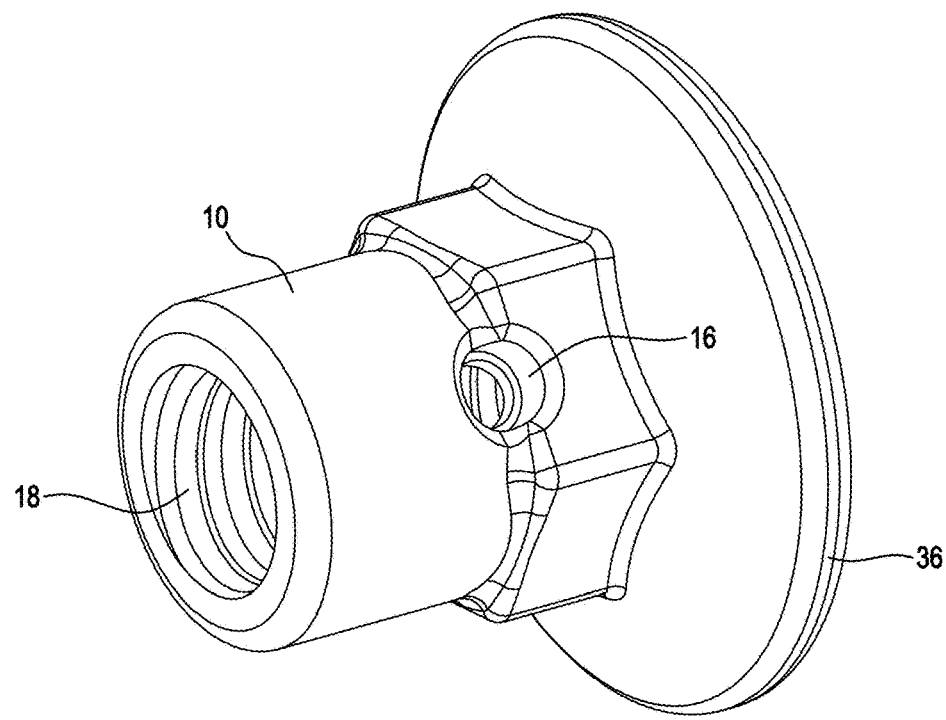
FIG. 14 shows a perspective view of the flange nut having a single port.
Figure 15:
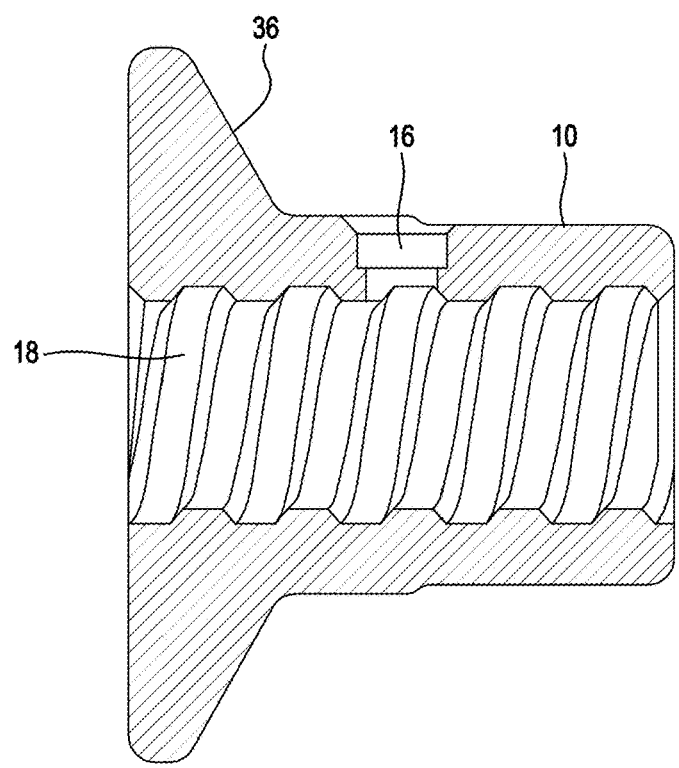
FIG. 15 shows a cross sectional view of the flange nut of FIG. 14.

With reference to FIGS. 12 to 15 of the drawings, it will be appreciated that other variations may be provided of a flange nut 10 type anchor in accordance with other examples of the present disclosure. In particular, the flange nut 10 may be provided with two ports, two ports with cap(s), or with one port. FIGS. 2 to 11 show the flange nut 10 having two opposed ports; FIGS. 12 and 13 show a flange nut 10 having two ports and a cap for each of the ports; and FIGS. 14 and 15 show a flange nut 10 having a single port.

More specifically, with reference to FIG. 12, the flange nut 10 utilizes two injection ports 16, 34 as well as a cap 46 which seals the second port 34 and prevents the loss of epoxy when filling through the first port 16. Turning to FIG. 13, the flange nut 10 may be provided with a first cap 44 for sealing the first port 16 and a second cap 46 for sealing the second port 34.

Accordingly, in this example, the flange nut 10 is provided with double injection ports 16, 34 with at least one cap 44, 46. The cap 44, 46 is provided to prevent epoxy flowing through the coupler and not filling the void in the thread. FIG. 12 shows the cap 46 in position in the second port 34 so as to prevent the loss of epoxy when filling through the first port 16. With reference to FIG. 13, a cap 44, 46 may be fitted to each of the injection ports 16, 34 on delivery. During installation, the injection port which is most accessible has the cap removed and epoxy is applied through this injection port. In FIG. 13 the port caps 44, 46 are shown in an exploded view relative to the flange nut 10.

The following steps are utilized for system assembly using a flange nut 10 having double injection ports with plug caps and a half nut in accordance with one embodiment of the present disclosure:

1. Position half nut 42 at desired position on reinforcing bar 14.
2. Wind flange nut 10 onto half nut 42 at desired position on reinforcing bar 14 reinforcement.
3. Tighten half nut 42 onto flange nut 10 to secure assembly on reinforcing bar 14 reinforcement.
4. Remove cap 44 from injection port 16 which is easiest to access and insert ISNE nozzle fitted to Epcon C8 XTREM cartridge into injection port 16.
5. While the nozzle is positioned in the injection port 16, insert epoxy until excess flows from free ends of the flange nut 10.
6. Do not disturb the assembly after 'gel time' (between 5 and 20 minutes, depending on the temperature) and allow the correct time for the epoxy to cure (between 8 and 60 hours depending on temperature and environmental conditions).

With reference to FIGS. 14 and 15, there is shown an example of the disclosure wherein the flange nut 10 has only a single injection port 16 to prevent the loss of epoxy when filling. In particular, FIG. 14 shows a perspective view of the flange nut 10 shown with a single injection port 16 and FIG. 15 shows a cross sectional view of the flange nut 10 with the single injection port 16. As can be seen clearly in FIG. 15, the flange nut 10 has only a single passage for injection of fluid material to flow into a cavity defined by an external surface of the reinforcing bar 14 and an internal surface of the nut 10, the single passage being in the form of the injection port 16.

The following steps are utilized for system assembly using a flange nut 10 having a single injection port and half nut in accordance with one embodiment of the present disclosure:

1. Position the half nut 42 at desired position on reinforcing bar 14 reinforcement.
2. Wind flange nut 10 onto half nut 42 at desired position on reinforcing bar 14 reinforcement.
3. Tighten half nut 42 onto the flange nut 10 to secure assembly on reinforcing bar 14 reinforcement.
4. Insert ISNE nozzle fitted to Epcon C8 XTREM cartridge into injection port 16.
5. While the nozzle is positioned in the injection port 16 insert epoxy until excess flows from free ends of the flange nut 10.
6. Do not disturb the assembly after 'gel time' (between 5 and 20 minutes, depending on the temperature) and allow the correct time for the epoxy to cure (between 8 and 60 hours depending on temperature and environmental conditions).

Accordingly, the following variations are provided within the scope of the disclosure: (1) double injection port in flange nut 10 product; (2) double injection port in flange nut 10 product with injection port cap(s); and (3) single injection port in flange nut 10 product.

Tooling can be used to assist access to the injection ports.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

LIST OF NUMBERED FEATURES

Flange nut 10
Epoxy 12
Reinforcing bar 14
Injection port 16
Female thread 18
Male thread 20
Cavity 22
External surface 24
Internal surface 26
Longitudinal axis 28
Outer surface 30
Inner surface 32
Second port 34
Flange 36
Assembly 38
Nozzle 40
Half nut 42
First cap 44
Second cap 46

The invention claimed is:

1. A nut assembly for threading onto a reinforcing bar, wherein the nut assembly comprises:
   a nut including:
      a female thread for threading onto a male thread of the reinforcing bar;
      a port positioned such that, when the nut is on the reinforcing bar, the port provides a passage for injection of fluid material to flow into a cavity defined by an external surface of the reinforcing bar and an internal surface of the nut; and
   a cap configured to cover the port.

2. The nut assembly of claim 1, wherein the port extends generally radially with respect to a longitudinal axis about which the nut can rotate on the reinforcing bar.

3. The nut assembly of claim 1, wherein the port is transverse of the nut, extending between an outer surface of the nut and an inner surface of the nut.

4. The nut assembly of claim 1, which only has a single passage for injection of fluid material to flow into a cavity defined by an external surface of the reinforcing bar and an internal surface of the nut, said single passage being in the form of said port.

5. The nut assembly of claim 1, which defines at least two passages for injection of fluid material to flow into a cavity defined by an external surface of the reinforcing bar and an internal surface of the nut, including a first passage defined by said port, said port being a first port, and a second passage defined by a second port.

6. The nut assembly of claim 5, wherein the second port is opposite the first port.

7. The nut assembly of claim 6, wherein the second port is diametrically opposite the first port.

8. The nut assembly of claim 5, which includes a first cap configured to cover the first port and a second cap configured to cover the second port.

9. The nut assembly of claim 1, which includes a flange.

10. The nut assembly of claim 1, wherein the port is in a central portion of the nut with respect to a longitudinal direction of the nut.

11. An assembly comprising:
   a reinforcing bar;
   a nut threadable onto the reinforcing bar such that an internal thread of the nut engages with a corresponding external thread of the reinforcing bar, wherein the nut includes a port positioned such that, when the nut is threaded on the reinforcing bar, the port provides a passage for injection of fluid material to flow into a cavity defined by an external surface of the reinforcing bar and an internal surface of the nut; and a cap configured to cover the port.

12. A method of securing a nut on a reinforcing bar, the method comprising:

threading the nut onto the reinforcing bar such that an internal thread of the nut is threaded onto an external thread of the reinforcing bar;

rotating the nut to locate the nut in a desired position along a length of the reinforcing bar;

injecting settable material through a port of the nut such that the settable material flows into a cavity between an external surface of the reinforcing bar and an internal surface of the nut; and observing a second port opposite the first port to determine when sufficient settable material has been injected through the first port, and ceasing injection of the settable material after observing sufficient settable material through the second port.

13. A nut for threading onto a reinforcing bar, wherein the nut comprises:

a female thread configured to be threaded onto a male thread of the reinforcing bar;

a first port positioned such that, when the nut is on the reinforcing bar, the first port provides a first passage for injection of fluid material to flow into a first cavity defined by an external surface of the reinforcing bar and an internal surface of the nut; and a second port positioned such that, when the nut is on the reinforcing bar, the second port provides a second passage for injection of fluid material to flow into a second cavity defined by the external surface of the reinforcing bar and the internal surface of the nut.

14. The nut of claim 13, wherein the second port is opposite the first port.

15. The nut of claim 13, wherein the second port is diametrically opposite the first port.

16. The nut of claim 13, which is configured such that a first cap can cover the first port and a second cap can cover the second port.

* * * * *